US008479923B2

(12) United States Patent
Seinera et al.

(10) Patent No.: US 8,479,923 B2
(45) Date of Patent: Jul. 9, 2013

(54) PROCESS FOR SELECTIVE SEPARATION AND FOR THE SIMULTANEOUS INCREASE IN PURITY, OF SPENT, FRAGMENTED, ORGANIC MATERIALS BY MEANS OF AQUEOUS MEDIA HAVING CHOSEN DENSITIES

(75) Inventors: Henri Seinera, Oullins (FR); Hughes De Feraudy, Charantay (FR)

(73) Assignee: Galloo Plastics

( * ) Notice: Subject to any disclaimer, the term of this patent is extended or adjusted under 35 U.S.C. 154(b) by 244 days.

(21) Appl. No.: 12/998,235

(22) PCT Filed: Sep. 29, 2009

(86) PCT No.: PCT/FR2009/001154
§ 371 (c)(1),
(2), (4) Date: Mar. 29, 2011

(87) PCT Pub. No.: WO2010/037927
PCT Pub. Date: Apr. 8, 2010

(65) Prior Publication Data
US 2011/0174747 A1    Jul. 21, 2011

(30) Foreign Application Priority Data

Sep. 30, 2008  (FR) ...................................... 08 05389

(51) Int. Cl.
*B03B 5/28* (2006.01)
(52) U.S. Cl.
USPC .......................... 209/173; 209/172.5; 210/800
(58) Field of Classification Search
USPC .......... 209/3.1, 162, 172, 172.5, 173; 521/40; 210/800, 805
See application file for complete search history.

(56) References Cited

U.S. PATENT DOCUMENTS

| 3,715,083 A | 2/1973 | Funk |
| 3,925,200 A | 12/1975 | Izumi et al. |
| 4,073,661 A | 2/1978 | Buzga et al. |
| 4,077,847 A | 3/1978 | Choi et al. |
| 4,079,837 A | 3/1978 | Grube et al. |
| 4,379,525 A | 4/1983 | Nowicki et al. |
| 4,406,411 A | 9/1983 | Gall et al. |
| 4,610,396 A | 9/1986 | Carbonell Serra et al. |
| 4,728,045 A | 3/1988 | Tomaszek |
| 4,809,854 A | 3/1989 | Tomaszek |
| 4,830,188 A | 5/1989 | Hannigan et al. |
| 4,849,116 A | 7/1989 | Weinmann et al. |
| 5,042,725 A | 8/1991 | Grimmer |
| 5,246,116 A | 9/1993 | Kirk |
| 5,268,074 A | 12/1993 | Brooks et al. |
| 5,277,758 A | 1/1994 | Brooks et al. |
| 5,280,837 A | 1/1994 | Belliveau |
| 5,295,582 A | 3/1994 | Dan |
| 5,341,935 A | 8/1994 | Djerf et al. |
| 5,358,119 A | 10/1994 | Stahl et al. |
| 5,375,778 A | 12/1994 | Lundquist |
| 5,390,860 A | 2/1995 | Ali et al. |
| 5,397,066 A * | 3/1995 | Leitman et al. ................. 241/19 |
| 5,443,157 A | 8/1995 | Baker et al. |
| 5,566,889 A | 10/1996 | Preiss |
| 5,609,256 A | 3/1997 | Mankosa |
| 5,653,867 A | 8/1997 | Jody et al. |
| 5,667,151 A | 9/1997 | Miura et al. |
| 5,738,222 A * | 4/1998 | Pagenkopf et al. ............... 209/7 |
| 5,740,918 A | 4/1998 | Hayashi et al. |
| 5,785,259 A | 7/1998 | Nishibori |
| 5,887,805 A | 3/1999 | Chapman |
| 5,894,996 A | 4/1999 | Williams |
| 5,957,295 A | 9/1999 | Neureither |
| 5,976,435 A | 11/1999 | Djerf et al. |
| 5,988,395 A | 11/1999 | Calo et al. |
| 6,007,005 A | 12/1999 | Gonzales et al. |
| 6,024,226 A | 2/2000 | Olivier |
| 6,095,441 A | 8/2000 | Unkelbach et al. |
| 6,114,401 A | 9/2000 | Doonan |
| 6,131,741 A | 10/2000 | Hagen |
| 6,138,929 A | 10/2000 | Montgomery |
| 6,213,306 B1 | 4/2001 | Fiedlschuster et al. |
| 6,216,967 B1 | 4/2001 | Hoberg et al. |
| 6,335,376 B1 * | 1/2002 | Allen et al. ................. 521/40.5 |
| 6,599,950 B2 * | 7/2003 | Jody et al. ........................ 521/48 |
| 7,172,143 B2 * | 2/2007 | Vandeputte ..................... 241/20 |

(Continued)

FOREIGN PATENT DOCUMENTS

DE 4329270 A1 8/1994
EP 1058609 A1 12/2000

(Continued)

OTHER PUBLICATIONS

International Search Report issued Jan. 27, 2010 for WO2010/037927.

*Primary Examiner* — Joseph C Rodriguez
(74) *Attorney, Agent, or Firm* — Edwards Wildman Palmer LLP; Scott D. Wofsy

(57) ABSTRACT

Process for the selective separation, and for the simultaneous increase in purity, of two spent, fragmented, synthetic organic materials having different densities, mixed together or mixed with various contaminating materials to be eliminated, by means of dense aqueous media, each aqueous medium of which has a chosen density "ds" as threshold for separating said organic materials and contaminants, characterized in that the process comprises: a) a step of separating the mixture into two streams, a supernatant stream (a1) and a settled stream (a2); b) a step of separating the components of the supernatant stream (a1), by eliminating the supernatant fraction and collecting the settled fraction formed from the fragments of the first recyclable spent synthetic organic material; c) a step of separating the components of the settled stream (a2) by collecting the supernatant fraction and eliminating the settled fraction; and d) a step of separating the components of the supernatant stream by eliminating the supernatant fraction and collecting the settled fraction formed from the fragments of the second recyclable spent synthetic organic material.

8 Claims, No Drawings

U.S. PATENT DOCUMENTS

| | | |
|---|---|---|
| 7,252,251 B2 | 8/2007 | DeFeraudy |
| 7,497,335 B2 * | 3/2009 | Bork et al. .................... 209/172 |
| 7,802,685 B2 * | 9/2010 | Allen et al. .................. 209/12.1 |
| 7,803,848 B2 | 9/2010 | De Feraudy et al. |
| 7,807,727 B2 | 10/2010 | De Feraudy et al. |
| 2003/0027877 A1 | 2/2003 | Jody et al. |
| 2008/0190819 A1 | 8/2008 | Schlummer et al. |

FOREIGN PATENT DOCUMENTS

| | | |
|---|---|---|
| LU | 88506 A1 | 2/1996 |
| WO | WO-94 21382 A1 | 9/1994 |
| WO | WO-2006 106234 | 10/2006 |

* cited by examiner

PROCESS FOR SELECTIVE SEPARATION AND FOR THE SIMULTANEOUS INCREASE IN PURITY, OF SPENT, FRAGMENTED, ORGANIC MATERIALS BY MEANS OF AQUEOUS MEDIA HAVING CHOSEN DENSITIES

FIELD OF THE INVENTION

The invention relates to a process for selectively separating and simultaneously for increasing the purity of at least two organic heterogeneous synthesis materials, in a mixture, such as filled or non-filled polymers and/or copolymers, accompanied or not by contaminating materials to be removed, in order to extract them from the mixture and separate them into decontaminated homogeneous materials and collect these homogeneous and recyclable materials with at least 99% purity by specific plastics processing means.

These polymers and/or copolymers, filled or not, are waste, in particular spent waste, to be recycled for upgrading, and these organic synthetic materials first result from the destruction by grinding of automobiles and durable consumer goods that have reached their end of life, then the separation thereof with the recyclable metal materials, then the separation thereof with the major portion of contaminating materials and a first separation of these materials in an aqueous medium with a density equal to 1, chosen as the separation threshold, into at least two flows:

one of the flows having a separation density of less than 1, obtained by the aqueous phase of density 1, capable of containing, in solution, an adequate amount of alcohol, in order to reduce this density to below 1;

the other flow having a separation density greater than or equal to 1, obtained by the aqueous phase capable of containing, in solution and/or in a stabilized suspension, inorganic soluble materials or inorganic insoluble powdery particles dispersed in the aqueous phase, so as to increase this density to above 1; these variations in density of the aqueous medium cause the selective separation of an organic material determined from the mixture of spent materials, separated into two flows.

The invention relates more specifically to a process for separating and simultaneously for increasing the purity of at least two heterogeneous organic materials in a mixture, obtained from one or the other flow, with a separation density equal to 1, accompanied or not by contaminating materials, and separating them homogeneously, while removing the contaminating materials capable of accompanying them.

The invention finally relates to the use of the process for separating at least two organic synthetic materials in a mixture, even with very similar densities, in order to upgrade them by recycling.

PRIOR ART

Problem Observed

The recycling industry is focusing increasingly on the selective recovery and recycling of spent organic synthetic materials.

These spent organic synthetic materials generally come from grinding residue of automobiles and durable consumer goods that have reached their end of life, in which a plurality of types of organic synthetic materials, which are filled or non-filled, flameproof or non-flameproof, admixed or non-admixed polymers and/or copolymers are to be considered to be upgradable when they are separated from a plurality of other materials considered to be irritating contaminants, such as metals, minerals, wood and other various contaminants, such as industrial waste, packaging waste from various sources and others. In the industries of recycling spent organic synthetic materials to be upgraded, various processes are performed in order to separate flow constituents that are more or less polluting and more or less polluted, more or less concentrated with upgradable organic synthetic materials to be separated from the pollutants, concentrated and sorted by homogeneous flows of types of organic synthetic materials present, such as, for example, polyethylene, polypropylene, polystyrene (PS), acrylonitrile-butadiene-styrene (ABS) copolymer, polyamides (PA), polyvinyl chloride (PVC), polyesters, polyurethane, polycarbonate, acrylic or methacrylic copolymers or others, in which all of the polymers may or may not be filled, admixed and flameproof.

These known processes currently make it possible to extract and separate flows to be treated, consisting of mixtures of organic synthetic materials to be upgraded and contaminant materials to be removed; these flows include:

an organic synthetic material phase with a density below 1, an organic synthetic material phase with a density greater than or equal to 1, an organic synthetic material phase, consisting for example of polyethylene or polyurethane foams, film waste, wires or others, a phase of contaminants to be removed, in which the constituents are not upgradable in such separation and upgrading processes, for example sand, glass debris, wood debris, metal residue or others.

One of these processes for separating polymer materials of all types coming from grinding of automobiles and/or other objects at their end of life (European patent EP 0918606 B) consists, after a grinding step ensuring fragmentation of the organic synthetic materials, preferably of performing a mechanical separation by shape factor, followed by a first density separation step that causes the separation of all of the organic synthetic materials to be upgraded into two flows:

one, with a density below 1, including in particular and for example non-filled polyolefins, such as polyethylenes (d=0.92 to 0.95), polypropylenes (d=around 0.9), ethylene and propylene copolymers, ethylene and vinylacetate copolymers, ethylene-propylene rubber (EPR) copolymers, ethylene-propylene-diene-monomer (EPDM) copolymers, polyethylene (PE), polypropylene (PP), polyurethane (PU) foams or others, the other, with a density greater than or equal to 1, including in particular and for example:

polystyrene: non-filled PS (d=around 1.05)

acrylonitrile-butadiene-styrene copolymers: non-filled ABS (d=around 1.07), polyvinyl chlorides: rigid non-filled PVC (d=around 1.30 to 1.40) and filled PVC (d=around 1.40 to 1.55), plasticized, such as plastisol and PVC foams, polycarbonates: non-filled PC, with a density d=1.20 to 1.24, PC filled at 20% with glass fibers having a density d=1.3 or PC filled at 30% with glass fibers having a density d=1.44, thermoplastic rubbers, except for thermosetting cellular rubbers, polyurethanes: filled PU (d=around 1.21), filled talc polypropylenes (talc PP filled at between 5% and 40% with talc), filled polyethylenes: (PE filled at between 2% and 40% of fillers), unsaturated polyesters (d ranging from around 1.10 to 1.13), saturated polyesters (d≧1.20), filled or not (often filled with glass fibers), polyamides: $PA_6$ (d=1.13), $PA_{6.6}$ (d=1.14), $PA_{6.10}$ (d=1.08), $PA_{11}$ (d=1.04), $PA_{12}$ (d=1.02), filled or non-filled, polymethyl methacrylates: PMMA (d=1.18), others.

These two flows are subsequently treated so as to extract each component therefrom, separate them according to homogeneous flows and treat them so as to produce formulated pellets that can be used directly according to plastics processing operations.

However, the treatment of these two flows in order to extract each spent organic synthetic material to be upgraded, according to homogeneous flows in order to subsequently produce formulated pellets, does not make it possible to finely and homogeneously select various polymer compounds present in a mixture in a flow of organic synthetic materials to be treated; and, in other words, to increase the purity of the extracted and separated polymer compounds.

In the case of the flow of the mixture of upgradable organic synthetic materials with a density below 1, this flow is treated by a series of steps of separation in aqueous media by baths with a density adapted according to a series of increasing bath densities, enabling a so-called homogeneous selection of the various polymer compounds present in said flow, but of which the purity after selection is insufficient.

In the case of the flow of the mixture of organic materials with a density greater than or equal to 1, the various organic synthetic materials resent problems in the separation in baths in which the density increases regularly from one bath to the next, which density is supposed to be adapted to this separation and stable over time, i.e. remains constant in each bath.

For this second flow, which consists of a mixture of filled or non-filled polymers and/or copolymers, of which the densities range from 1 to around 1.6, the separation of the various organic synthetic materials present in the mixture is performed by increasing density in successive hydraulic separators, and the aqueous separation medium in each separator is formed by water, soluble inorganic compounds such as mineral salts and/or inorganic compounds such as clays and in particular bentonite, in which all of these compounds are implemented so as to increase the density of the liquid phase and bring it to a density value enabling separation of the various organic synthetic materials into two distinct phases, one supernatant and the other being subject to sedimentation at the base of the separator, of which each sedimentation phase forms a new flow subjected in turn to a new density separation into two distinct phases, one supernatant and the other being subject to sedimentation at the base of the separator.

It thus appears in the prior art that to separate, by a difference in density, spent polymer materials, in a mixture, by means of a series of hydraulic separators according to two phases, one supernatant and the other being subject to sedimentation, the density of the hydraulic medium in each separator regularly increases from one separator to another, closer and closer, until the separation of each type of spent polymer material initially present is complete.

Such a process of separating spent polymer materials in a mixture including acrylonitrile-butadiene-styrene (ABS), polycarbonate (PC), ABS/PC alloys, polystyrene (PS) and polyolefins (PE, PP) resulting from the grinding of durable consumer goods at their end of life, is described in the patent application U.S. 2003/0027877 and consists, after two steps of granulation by grinding (6 mm, then 2 mm) of performing a density separation of ABS and PC in a mixture, by hydroseparation according to a series of four steps in aqueous media of increasing densities:

the aqueous medium of the first separation step having a density of 1.04 enabling the removal of the supernatant fraction formed by polyolefins, polystyrene and a small amount of ABS and the recovery of the sedimentation fraction treated in the second separation step, the aqueous medium of the second separation step having a density of 1.090, which enables recovery of the supernatant fraction formed by the first recoverable product consisting of ABS and PC and a sedimentation fraction treated in the third separation step, the aqueous medium of the third separation step having a density of 1.160 of which the supernatant fraction is removed and the sedimentation fraction is sent to the fourth separation step for treatment, the aqueous medium of the fourth separation step having a density of 1.203 of which the supernatant fraction formed by the second recoverable product consisting of ABS and PC is recovered and the sedimentation fraction is repeated.

However, it appears that in use, in particular in density separation installations used in industrial assemblies for treating spent organic synthetic materials to be upgraded, that the aqueous separation media are not stable enough over time to enable sufficiently selective and homogeneous density separations, i.e. providing clear separations into types of sorted materials, in which said aqueous separation media can change by contamination. Therefore, the flows coming from the separation can be mixed with a plurality of materials of which the respective densities can be close to one another, and that the sorted materials do not reach purities higher than 96%, or 98%.

Various particularly detrimental phenomena developing in these liquid density separation media have indeed been observed; these detrimental phenomena, which are real disadvantages, include:

major difficulty obtaining polymer materials, separated from one another, with a high purity, a change in the rheology of said liquid media, which is manifested by a disrupting variation in their viscosity to a more fluid or more pasty state, a deviation or variation in the apparent density of the liquid media, of which the density cannot remain stable at the level initially chosen for good separation of the spent organic synthetic materials to be upgraded, in which this deviation (variation) causes a change in the composition of the flows separated by a dense liquid medium, sedimentation over time of a portion of the inorganic compounds dispersed in the aqueous medium in order to create the chosen density, partly at the origin of the change in the density of the liquid separation medium.

Therefore, there is an obvious and significant problem with regard to the density separation of spent organic synthetic materials to be upgraded such as filled or non-filled polymers and/or copolymers constituting spent waste to be recycled, obtained from the destruction by grinding of automobiles and durable consumer goods that have reached their end of life, in order to obtain selected homogeneous flows of separated materials, without there being any deviation in the density or the mixture of the selected materials, or a mixture of a selected material with contaminants, and to obtain flows of separated organic synthetic materials with greater purity.

SUMMARY OF THE INVENTION

The process of selective density separation, and simultaneously of increasing purity according to the invention of spent organic synthetic materials to be recycled in order to upgrade them, with a density of less than 1 or greater than or equal to 1, obtained from the destruction by grinding of durable consumer goods that have reached their end of life, such as automobiles, household appliances, and electronics, makes it possible to eliminate the disadvantages identified in the prior art, and simultaneously to provide substantial improvements to the means previously described.

According to the invention, the process for selective separation and simultaneously for increasing the purity of two fragmented spent organic synthetic materials of different densities, mixed with one another and mixed with various contaminants to be removed, with a density of less than or greater than 1, by means of dense aqueous media, in which each aqueous medium has a chosen density "ds" as the threshold for separation of said organic and contaminant materials into two flows, one supernatant and the other sedimentation, is characterized in that it comprises:

a) a step of high-density ds (a) separation of the mixture into two flows, one supernatant (a1) and the other sedimentation (a2) by means of an aqueous medium of which the density ds (a) is chosen as an intermediate value between the densities of each of the organic synthetic materials to be separated, preferably close to the density of the organic material to be separated having the lowest density so as to ensure complete flotation, b) a step of low-density ds (b) separation of the compounds of the supernatant flow (a1) by means of an aqueous medium of which the density ds(b) is chosen so as to be below ds (a) so as to remove a supernatant flow (b1) formed by contaminants and collect a sedimentation flow (b2) formed by fragments of the first spent organic synthetic material to be recycled, c) a step of high-density ds (c) separation which is greater than ds (a) of the compounds of the sedimentation flow (a2) by means of an aqueous medium of which the density ds (c) is chosen so as to be at least equal to the density of the organic synthetic material present in said flow (a2), of which the supernatant flow (c1) is formed by the mixture of fragments of the organic synthetic material with a density ds (c) and contaminant materials with densities between ds (a) and ds (c), and the sedimentation flow (a2) is formed by contaminant materials with a density below ds (c), which is removed, d) a step of low-density ds (d) separation of the supernatant (c1) by means of an aqueous medium of which the density ds (d) is chosen so as to be less than ds (c), of which the supernatant flow (d1) is formed by contaminant materials with densities between ds (a) and ds (c), and is removed, and of which the sedimentation flow (d2) formed by fragments of the homogeneous spent organic synthetic material, with a density ds (d), is collected so as to be upgraded.

DETAILED DESCRIPTION OF THE INVENTION

Thus, and even though the processes described in the prior art involve separations of spent organic synthetic materials in a mixture, by differences in density, according to two phases, one supernatant and the other being subject to sedimentation, by means of a series of hydraulic separators in which the density of the aqueous separation medium is increased regularly and systematically from one separator to the next until the final phase, the process according to the invention involves an alternation of densities in the successive separators, i.e. a high-density separator is followed by a low-density separator, which is in turn followed by a high-density separator, so that a floating phase in a high-density separator becomes a sedimentation phase in the next separator, and so on.

In the process according to the invention:

the step of separation (a) of the mixture of the two spent organic synthetic materials and contaminants accompanying them consists of separating this mixture into two flows by means of an aqueous medium of which the density "dsa" of separation has an intermediate value between the densities of each of the organic synthetic materials to be separated and chosen so as to enable the flotation of the organic material with the lowest density:

a1) the supernatant flow is formed by fragments of the homogeneous organic synthetic material and the contaminant materials, with a density at least equal to "dsa", a2) the sedimentation flow is formed by fragments of the homogeneous organic synthetic material and contaminant materials with a density greater than "dsa";

the step of separation (b) of the mixture of the two spent organic synthetic materials and the contaminants accompanying them consists of separating the compounds of the supernatant flow (a1) by treating it by means of an aqueous medium having a density "dsb" below "dsa", of which the supernatant (b1), formed by contaminants with a density below "dsb" is removed, and of which the sedimentation (b2) formed by fragments of the homogeneous organic synthetic material with a density "dsb" to be upgraded is collected so as to be recycled and upgraded;

the step of separation (c) of the mixture of the two spent organic synthetic materials and contaminants accompanying them consists of treating the sedimentation flow (a2) by separating it by means of an aqueous medium having a density "dsc" greater than the density "dsa" but at least equal to the density of the organic synthetic material present in said sedimentation flow (a2), of which the supernatant (c1) formed by the mixture of fragments of organic synthetic material with a density "dsc" and contaminant materials with densities between "dsa" and "dsc" is collected and of which the sedimentation fraction (c2) formed by contaminant materials with a density greater than "dsc" is removed;

the step of separation (d) of the supernatant flow (c1) formed by the mixture of the two spent organic synthetic materials and the contaminants accompanying them consists of treating this supernatant flow by separating it by means of an aqueous medium having a density "dsd" below the density "dsc" of which the supernatant (d1) formed by contaminant materials with densities between "dsa" and "dsc" is removed and of which the sedimentation fraction (d2) formed by fragments of the homogeneous organic synthetic material with a density "dsd" is collected so as to be recycled and upgraded.

The process of selective separation according to the invention of the mixture of fragmented spent organic synthetic materials to be upgraded by recycling applies to all filled or non-filled polymer and/or copolymer materials to be upgraded, whether they are of thermoplastic and/or thermoset origin.

The mixture of fragmented spent organic synthetic materials to be upgraded by recycling and to be separated by means of the separation process according to the invention is obtained, in most cases, from processes of upgrading spent organic synthetic materials coming from all types of waste including, in particular, automobile grinding tailings, durable consumer goods that have reached their end of life or other waste from which numerous types of spent and upgradable organic synthetic materials, which are filled or non-filled, flameproof or non-flameproof, admixed or non-admixed polymers and/or copolymers, have been extracted by at least partial separation and separation from other materials known to be contaminants, such as wood, minerals, metals, glass, rubber, polyolefin or polyurethane foams, wires, fabrics, film waste and others.

The fragmented, spent organic synthetic waste materials in a mixture to be separated at least into two and removed from the rest of the contaminant materials by the separation process according to the invention are then in a state of cleanliness and dryness so that they cannot significantly change the density "ds" of the aqueous separation medium chosen as the separation threshold.

The aqueous separation medium with a density "ds" chosen as the separation threshold implemented in the separation process according to the invention is chosen so that it can separate organic synthetic materials obtained both from a flow of spent organic synthetic materials in a mixture to be upgraded, in which each type of material has a density of less than 1, and a flow of spent organic synthetic materials in a mixture to be upgraded, in which each type of material has a density greater than or equal to 1.

When the flow of organic synthetic materials to be upgraded has a density of less than 1, the aqueous separation medium consists of water and at least one water-soluble organic agent having a density of less than 1, such as, for example, a mono- or polyhydroxylated alcohol, such as, for the most simple ones, methanol, ethanol, propanol, butanol, isobutanol, glycol, etc., in which the amount of this agent is controlled so as to reach the value chosen as the separation threshold for the density "ds".

When the flow of organic synthetic materials to be upgraded has a density greater than or equal to 1, the aqueous separation medium is formed by water for a separation threshold "ds0" chosen to be exactly equal to 1, consists of water and inorganic water-soluble compounds such as mineral salts and/or mineral compounds that are insoluble or with low solubility in water with a very small particle size such as clays, calcium carbonate, suspended in water, in a controlled amount so as to obtain the value chosen as the separation threshold for the density "ds".

Once the fragmented, spent organic synthetic materials are separated into two flows of homogeneous organic synthetic materials and freed of the contaminant materials accompanying them, they can be extruded in the form of admixed or non-admixed polymer granules when said fragments are thermoplastic, in which these recycling granules are introduced into the industrial operation circuits so as to be used in the production of parts for the automobile, household appliance and electronics industries or others according to plastics processing techniques.

The density separation process according to the invention applies to the selective separation of at least two organic synthetic materials in a mixture and the removal of the contaminant materials accompanying them, in which the materials are filled or non-filled polymers and/or copolymers that may be spent waste to be recycled, in particular obtained from the destruction by grinding of automobiles and durable consumer goods that have reached their end of life.

By the process according to the invention, the two organic synthetic materials initially in a mixture, then separated, can each reach a level of purity of 99%.

Example

The invention can be better understood in reference to the illustration in the form of an example involving the density separation in an aqueous medium of a mixture of fragmented polyethylene and polypropylene and contaminant materials to be removed, in which said mixture is obtained from the destruction by grinding of end-of-life vehicles.

Two tons of material comprised as follows are treated according to the process:
  1.204 tons of a mixture of polypropylene and polypropylene filled with talc at 3% with a density of 0.920, i.e. 60.2% of the total,
  0.684 tons of polyethylene, i.e. 34.2% of the total,
  0.056 tons of contaminant C1, i.e. 2.8% of the total (density<that of the polypropylene),
  0.036 tons of contaminant C2, i.e. 1.8% of the total (density>polypropylene and <polyethylene),
  0.020 tons of contaminant C3, i.e. 1.0% of the total (density>polyethylene). I.e. a total of 2 tons.

The nature of each contaminant C1, C2, C3 is as follows:
  C1 consists of foams (polyurethane, polypropylene, polyethylene, etc.), wood, cellular or expanded plastics, and others,
  C2 consists of slightly-filled polypropylene (talc or other),
  C3 consists of silicones, polystyrene, ABS and others.

The densities chosen for sorting in an aqueous medium are as follows:
  for separation step (a), the density of the aqueous separation medium is chosen in the range of 0.925 to 0.930:
  the polypropylene floats with C1; the polyethylene settles with C2 and C3;
  for separation step (b), the density of the aqueous separation medium is chosen in the range of 0.850 to 0.890:
  the polypropylene settles and is recovered; C1 is supernatant;
  for separation step (c), the density of the aqueous separation medium is chosen in the range of 0.940 to 0.950:
  the polyethylene is supernatant with C2; C3 settles;
  for separation step (d), the density of the aqueous separation medium is chosen in the range of 0.910 to 0.920:
  the polypropylene settles and is recovered; C2 is supernatant and is removed.

The polypropylenes and polyethylenes recovered are homogeneous and have a very good level of purity enabling them to be recycled in all industrial fields and in particular the automobile industry.

Contaminants C1, C2 and C3 can subsequently be treated in order to recover polymers such as polystyrene, ABS, PS and others.

The invention claimed is:

1. A process for selective separation and simultaneously for increasing the purity of two fragmented spent organic synthetic materials of different densities, mixed with one another and mixed with various contaminants to be removed, with a density of less than or greater than 1, by means of dense aqueous media, in which each aqueous medium has a chosen density "ds" as the threshold for separation of said organic and contaminant materials into two flows, one supernatant and the other being subject to sedimentation; said process is characterized in that it comprises:
  a) a step of high-density ds(a) separation of the mixture into two flows, one supernatant (a1) and the other being subject to sedimentation (a2) by means of an aqueous medium of which the density ds(a) is chosen as an intermediate value between the densities of each of the organic synthetic materials to be separated,
  b) a step of low-density ds(b) separation of the compounds of the supernatant flow (a1) by means of an aqueous medium of which the density ds(b) is chosen so as to be below ds(a) so as to remove a supernatant flow (b1) formed buy contaminants and collect a sedimentation flow (b2) formed by fragments of the first spent organic synthetic material to be recycled, c) a step of high-density ds (c) separation which is greater than ds(a) of the compounds of the sedimentation flow (a2) by means of an aqueous medium of which the density ds(c) is chosen so as to be at least equal to the density of the organic synthetic material present in said flow (a2), of which the supernatant flow (c1) is formed by the mixture of fragments of the organic synthetic material with a density ds(c) and contaminant materials with densities between ds(a) and ds(c), and the sedimentation flow (a2) is formed by contaminant materials with a density below ds(c), which is removed, and d) a step of low-density ds(d) separation of the supernatant (c1) by means of an aqueous medium of which the density ds(d) is chosen so as to be less than ds(c), of which the supernatant flow (d1) is formed by contaminant materials with densities between ds(a) and ds(c), and is removed, and of which the sedimentation flow (d2) formed by fragments of the homogeneous spent organic synthetic material, with a density ds(d), is collected to be upgraded.

2. The process according to claim 1, characterized in that, when the flow of organic synthetic materials to be upgraded has a density of less than 1, the aqueous separation medium consists of water and at least one water-soluble organic agent with a density of less than 1, in which the amount of said agent is controlled so as to reach the value chosen as the separation threshold for the density "ds".

3. The process according to claim 1, characterized in that, when the flow of organic synthetic materials to be upgraded has a density greater than or equal to 1, the aqueous separation medium is formed by water for a separation threshold "ds0" chosen to be exactly equal to 1, consists of water and mineral water-soluble compounds that are insoluble or with low solubility in water with a very small particle size suspended in water, in a controlled amount so as to obtain the value chosen as the separation threshold for the density "ds".

4. The use of the process according to any one of claims 1 to 3 in the separation of at least two fragmented, spent organic synthetic materials and the separation of same from the contaminant materials accompanying them, in which said organic synthetic materials are filled or non-filled polymers or copolymers to be upgraded, of thermoplastic and/or thermoset origin.

5. The process according to claim 2, characterized in that said water soluble organic agent is a mono- or polyhydroxylated alcohol.

6. The process according to claim 5, characterized in that, said mono- or polyhydroxylated alcohol is methanol, ethanol, propanol, butanol, isobutanol or glycol.

7. The process according to claim 3, characterized in that, said mineral water-soluble compounds are mineral salts.

8. The process according to claim 3, characterized in that, said mineral compounds insoluble or with low solubility in water are clays and calcium carbonate.

\* \* \* \* \*